United States Patent [19]

Pierik

[11] Patent Number: 4,659,299

[45] Date of Patent: Apr. 21, 1987

[54] MASH PELLETING APPARATUS

[75] Inventor: Henry Pierik, Forestville, Calif.

[73] Assignee: California Pellet Mill Company, San Francisco, Calif.

[21] Appl. No.: 790,612

[22] Filed: Oct. 23, 1985

[51] Int. Cl.⁴ ................................. B29B 9/16
[52] U.S. Cl. ..................... 425/72 R; 425/DIG. 230
[58] Field of Search ................ 425/72 R, DIG. 230

[56] References Cited

U.S. PATENT DOCUMENTS

| | | | |
|---|---|---|---|
| 2,651,269 | 9/1953 | French | 425/72 R |
| 2,772,642 | 12/1956 | Lindl | 425/DIG. 230 |
| 3,181,482 | 5/1965 | Heath et al. | 425/DIG. 230 |
| 4,028,030 | 6/1977 | Imhof | 425/DIG. 230 |
| 4,163,469 | 8/1979 | English | 425/DIG. 230 |

Primary Examiner—Tim Miles
Attorney, Agent, or Firm—Frank S. Troidl

[57] ABSTRACT

Pre-heated mash is pelleted. The resulting warm pellets are cooled by the ambient air and the ambient air is heated by the warm pellets. The heated ambient air is used to pre-heat the mash.

4 Claims, 2 Drawing Figures

MASH PELLETING APPARATUS

BACKGROUND OF THE INVENTION

This invention relates to the pelleting of mash. More particularly this invention is a new combination of apparatus and a new method for pre-heating the mash before it is fed to the pellet mill.

There are several advantages to feeding live stock pellets versus the same formula in mash form. In certain feeds, the steam conditioning process prior to pelleting creates chemical changes in the feed making it possible for animals to more rapidly digest and convert the feed to weight. Animals fed pellets are forced to accept every ingredient in the formula, preventing them from picking from the mash only those ingredients they like and rejecting others. Pelleting normally increases the bulk density of mash anywhere from 40% to 100%, thus decreasing the volume of required storage in the same proportion. Many forms of mash, particularly, fluffy feeds molasified or high fat added feeds and urea feeds will hang up in the storage bins. Feeding mash in outdoor lots or bunkers can result in blow-away of substantial percentages of mash. Also, the Federal Drug Administration has recommended pelleting for preventing salmonellosis by killing salmonella possibly present in animal feeds. The destruction of the bacteria occurs from the conditioning process combined with friction heat and pressures of the pelleting process which raise the temperature of the mash and pellets.

Climate affects the pellet quality and output of a pellet mill. In cold climate the temperature of the mash is lower than normal with the result that there is a lower output of the pellet mill. The outside feed bins cause cold product to be batched, and high quantities of steam are necessary for conditioning the product prior to the feeding of the product to the pelleting part of the pellet mill. However, the amount of steam must, of necessity, be limited in order to avoid inefficient operation of the die. Dry heat could be used to condition the product rather than the steam but the costs are prohibitive.

One current method suggested for pre-heating the mash is to divert the mash for the pellet mill feeder and to mix the mash with the warm pellets coming from the pellet mill. After a certain retention time, the combined product is screened, and the pellets conveyed to a cooler and the pre-warmed mash directed to the feeder. Drawbacks are that the screening causes more fines and the pellets have a dusty appearance.

SUMMARY OF THE INVENTION

This invention is a new combination of equipment for producing pellets from a mash and a new method of making pellets from a mash. In the new equipment and process, there is no direct mixing of the pellets coming from the pellet mill with the mash feed. Therefore, there is no need for a screening operation, thus eliminating any increased production of fines.

Briefly described, the invention includes a pellet mill and an air cooler having ambient air inlet means, a warm pellet inlet, and a cooled pellet outlet. Warm air conduit means are constructed to provide air flow paths from the ambient air inlet of the cooler, through the air cooler, and through the warm air conduit means. Means are provided for feeding the warm pellets from the pellet mill to the air cooler warm pellet inlet. Means are also constructed to convey the warm pellets from the warm pellet inlet and through the air flow paths and out the cooled pellet outlet thereby providing warm air in the air flow paths by the cooling of the warm pellets. A mash inlet is provided and also mash conveying means for conveying the mash to the pellet mill, the conveying means having at least a portion thereof passing through the warm air in the air flow paths to pre-heat the mash.

In the new method of making pellets from a mash, pre-heated mash is pelleted to thereby form warm pellets. Thereafter, the warm pellets are cooled by ambient air and the ambient air is heated by the heat from the warm pellets. The heated ambient air is used to pre-heat the mash.

BRIEF DESCRIPTION OF THE DRAWINGS

The invention, as well as its many advantages, may be further understood by reference to the following detailed description and drawings in which.

DETAILED DESCRIPTION OF THE INVENTION

Figure 1:
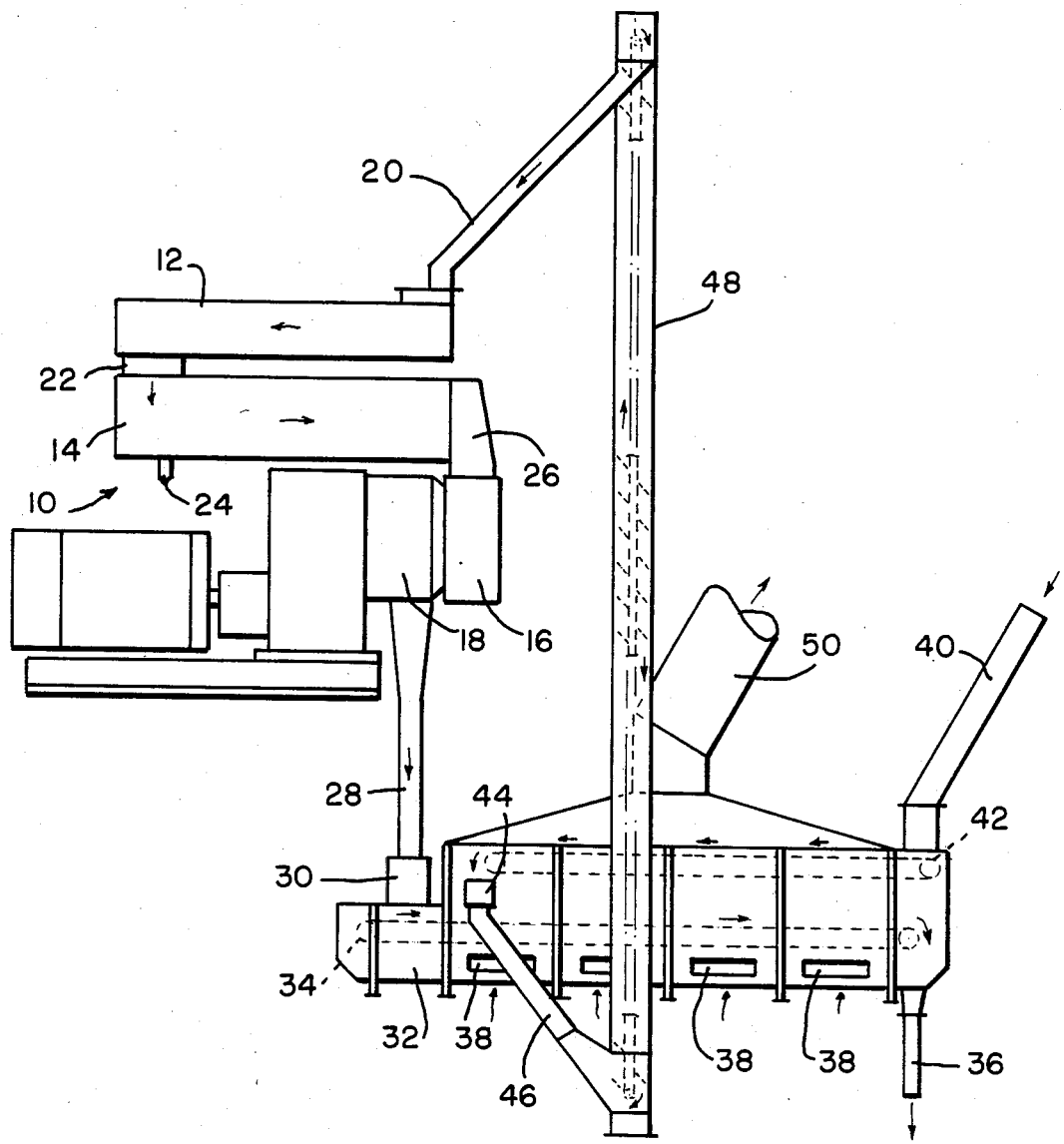
FIG. 1 is a schematic representation of one embodiment of the invention.

In the various figures, like parts are referred to by like numbers. Referring to the drawings, and more particularly to FIG. 1, the pellet mill indicated generally by the number 10 includes a feeder 12, a conditioner 14, a feeder chute 16, and a pellet chamber 18.

The pre-heated mash is fed to the feeder 12 by means of a gravity conduit 20. Conveying means, such as a screw conveyor (not shown), conveys the mash through the feeder and the mash is then dropped through conduit 22 into the conditioner 14. Heat is one important factor in controlling the quality of the pellet. Steam to heat the mash in the conditioner 14. may be fed through steam inlet 24 to conditioner 14. If desired, molasses may also be added to the conditioner 14, in which case a molasses inlet will also be provided. The molasses is added to the mash to make the resulting pellets sweet so that the livestock may be more inclined to eat the pelleted material. The amount of moisture added to the mash by the steam introduced into the conditioner 14 must be carefully controlled since excessive amounts of moisture additions will cause the mash to become "mushy" on the die faces contained in the pellet chamber 18 and, therefore, too wet to push through the die holes. The rollers will "skid" and the die "choke"—or stop producing.

The conditioned mash is fed by means of conduit 26 to the feed chute 16. The feed chute 16 may be the type of chute which permits the adjustment of the amount of mash fed to the pellet chamber 18 and, if desired, cut-off the feed of the mash to the pellet chamber 18.

In the pellet chamber 18, the dies make pellets out of the mash fed to the pellet chamber 18. The steam in conditioner 14 adds heat to the mash, most of which is retained as the mash is fed into the pellet chamber 18 and pelleted. Additional heat is added to the pellets by the operation of the die in the pellet chamber 18.

The warm pellets are fed from the pellet chamber 18 of the pellet mill 10, through the warm pellet conduit 28 to the warm pellet inlet 30 of air cooler 32. The air cooler 32 is used to remove the moisture and heat from the warm pellets. The removal of the moisture and heat is necessary to prevent mold or spoilage and to harden the pellets for conveying and handling with minimum breakage and minimum creation of fines.

Good cooling requires adequate air and pellet retention time in the cooler 32. To provide adequate retention time in the cooler 32, the warm pellets fed to the cooler 32 through warm pellet inlet 30 fall on a conveying means, such as belt conveyor 34, and are conveyed completely through the air cooler 32. At the other end of the air cooler 32 from warm pellet inlet 30, the pellets which have now been cooled drop off the end of belt conveyor 34 and fall by gravity from the air cooler 32 through the cooled pellet outlet 36.

The warm pellets on the belt conveyor 34 are cooled and the moisture removed therefrom by ambient air flow pass the belt conveyor 34. The ambient air is introduced into the air cooler 32 by means of a plurality of ambient air inlets 38.

As the ambient air entering the air cooler 32 through ambient air inlets 38 flows past the warm pellets to cool and dry said pellets, the air, of course, is heated by the heat taken from the warm pellets. This heated air is used in accordance with this invention to pre-heat the mash fed by gravity through mash conduit 20 to the feeder 12.

The pre-heating is done by feeding the mash to the air cooler 32 by means of a mash inlet 40. The mash fed to the air cooler 32 falls upon a belt conveyor 42 and is conveyed to a second conveyor (not shown) arranged perpendicular to the conveyor 42 and then out the mash exit 44. The pre-heated mash from mash exit 44 is fed by gravity through the pre-heated mash conduit 46 to a vertically extending pipe 48 which contains a bucket elevator. The bucket elevator in the vertically extending pipe 48 lifts the warmed mash up the vertically extending pipe 48 and drops the warmed mash into the conduit 20.

In the embodiment of FIG. 1, the airflow path is provided from the ambient air inlets 38, through the cooler 32, through the belt conveyor 34 to cool and remove moisture from the warm pellets and pick up heat, through the conveyor 42 to pre-heat the mash and then exits the air cooler 32 through the warm air conduit 50. The belt conveyor 42 conveys the mash through the warm air in the air flow path to pre-heat the mash.

In operation, the pre-heated mash is pelleted in the pellet chamber 18 after it has been conditioned in the conditioner 14 by the addition of steam. The warm pellets from the pellet chamber 18 are fed to the air cooler 32 where they are cooled by ambient air entering the air cooler 32 through air inlets 38. The air which is heated by the warm pellets is used to pre-heat the mash conveyed through the air cooler 32 on the belt conveyor 42. The pre-heated mash is fed to the feeder 12 of the pellet mill 10 by means of the pre-heated mash exit 44, conduit 46, bucket elevator 48, and gravity flow conduit 20. There is no direct contact of the warm pellets with the mash. Therefore, there is no need for any screening of the material as would be the case if the pre-heating was done by directly mixing the warm pellets with the mash. Because there is no need for screening, the amount of fines resulting from the operation is minimized.

Figure 2:
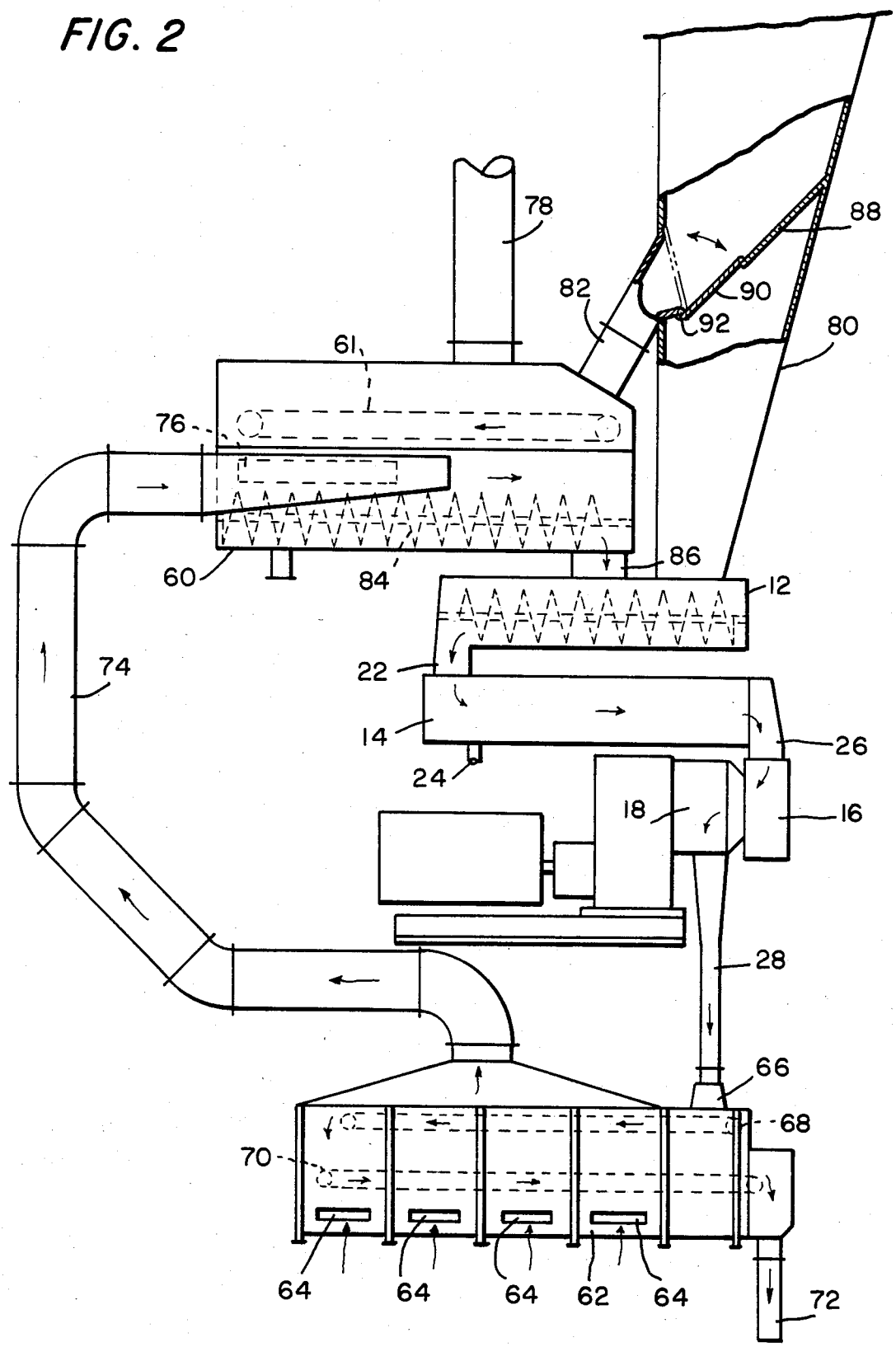
FIG. 2 is a schematic representation of another embodiment of the invention.

In the embodiment shown in FIG. 2, instead of pre-heating the mash in the air cooler, the mash is pre-heated in a separate mash pre-heater 60. The air cooler 62 is provided with the ambient air inlets 64. The warm pellets from the pellet chamber 18 are fed by gravity through chute 28 to the warm pellet inlet 66 where they drop onto a belt conveyor 68. The warm pellets are conveyed by the belt conveyor 68 from right to left, looking at FIG. 2, and dropped onto the left side of the belt conveyor 70. The pellets are then conveyed by the belt conveyor 70 from left to right, looking at FIG. 2, and exit from the cooler 62 through the cooled pellet outlet 72 as cooled pellets.

The ambient air entering the ambient air inlets 64 create a flow path through the belt conveyors 70 and 68, and through the warmed air conduit 74 to the warmed air inlet 76 of the mash pre-heater 60. An air outlet 78 provides for the removal of the air which has flowed through the mash pre-heater 60. Thus the ambient flow paths include the ambient air inlets 64, cooler 62, the heated air conduit 74, the inlet 76 to the pre-heater 60, the pre-heater 60, and the air outlet 78. The ambient air cools the warm pellets which are being conveyed along belt conveyors 68 and 70 and, of course, the ambient air is heated by the heat contained in the warm pellets. The warm air which is conducted to the mash pre-heater 60 by means of warm air conduit 74 is used to pre-heat the mash which is fed to the mash pre-heater 60.

The mash to be pre-heated is fed from a mash bin 80 through the conduit 82 and drops into a solid pan louvered tray conveyor 61 to the mash pre-heater 60. The mash is conveyed on tray conveyor 61 from right to left, looking at FIG. 2, and dropped onto the left side of the screw conveyor 84. The mash is pre-heated by the warm air flowing through the mash pre-heater 60. The pre-heated mash is fed by means of screw conveyor 84 in the mash pre-heater 60 to the conduit 86 and into the feeder 12.

If the climate is such that it is not necessary to pre-heat the mash or the formula of the ingredients contained in the mash does not require pre-heating, the mash may be fed directly to the feeder 12 thus by-passing the mash pre-heater 60. The mash bin 80 is provided with a sloping wall 88 having an opening which is open or closed by the position of a pivotable door 90 which pivots about the pivot 92. When it is desired to by-pass the mash pre-heater 60, the door 90 may be pivoted about the pivot 92 to close off the conduit 82 leading to the mash pre-heater 60 and to open the bottom wall 88 to permit the mash to flow directly to the feeder 12.

In the operation of the embodiment of FIG. 2, the mash from the mash bin 80 is fed through conduit 82 to the mash pre-heater 60 when the door 90 in the bin 80 is in the position shown in FIG. 2. The mash is pre-heated in the pre-heater 60 by the hot air flowing through the pre-heater 60. The pre-heated mash is conveyed by conveyor 84 to the conduit 86 into the feeder 12. The feeder 12 conveys the pre-heated mash to the conditioner 14. Steam is added to the mash by means of steam inlet 24 to further heat the mash and provide the necessary moisture. The conditioned mash is fed through conduit 26 and chute 16 to the pellet chamber 18 where the mash is formed into pellets and further heated. The heated pellets are fed through hot pellet conduit 28 to the air cooler 62. The warm pellets are cooled by the ambient air flowing through the air inlets 64. The cooled pellets are removed from the air cooler 62 by means of cooled pellet exit 72.

The warmed ambient air from the air cooler 62 is conducted through warm air conduit 74 to the inlet 76 of the mash pre-heater 60. This warmed air is used to pre-heat the mash in the mash pre-heater 60. The air exits from the air outlet 78.

I claim:

1. In combination: A pellet mill having a mash inlet and a pellet outlet; an air cooler having ambient air inlet means, a separate warm pellet inlet, and a cooled pellet outlet; a warm air conduit system comprising at least one warm air conduit constructed to provide air flow paths from the ambient air inlet means, through the air cooler, and through the warm air conduit; means for feeding the warm pellets from the pellet mill to the air cooler warm pellet inlet; means constructed to convey the said pellets from the warm pellet inlet, and through the air flow paths and out the cooled pellet outlet whereby the ambient air is heated by the warm pellets and the warm pellets are cooled by the ambient air thereby providing warm air in the warm air conduit system by the cooling of the warm pellets; and mash conveying means for conveying the mash to the pellet mill mash inlet, said mash conveying means including a mash conveyor passing through the warm air in the warm air conduit system to pre-heat the mash.

2. The combination in accordance with claim 1 wherein: the warm air conduit system has a warm air conduit extending from the air cooler, a mash pre-heating vessel having a mash inlet and an air outlet, said mash pre-heating vessel being connected to the warm air conduit so that warm air flows through the pre-heating vessel and out the air outlet, and said mash conveyor is located in the pre-heating vessel; and means for conveying pre-heated mash from the pre-heating vessel to the pellet mill mash inlet.

3. The combination in accordance with claim 1 wherein the mash conveyor is located in the air cooler and adapted to receive the mash and convey the mash through the warm air in the air cooler, and the mash conveying means also includes means for conveying the warmed mash from the air cooler to the pellet mill.

4. The combination in accordance with claim 3 wherein: a pellet conveyor is located in the air cooler and conveys the pellets from the warm pellet inlet to the cooled pellet outlet, the mash conveyor is located above the pellet conveyor; and the mash conveyor and pellet conveyor move in opposite directions within the air cooler.

* * * * *